United States Patent
Stumpf

(10) Patent No.: US 6,983,642 B2
(45) Date of Patent: Jan. 10, 2006

(54) SYSTEM AND METHOD FOR AUTOMATICALLY JUDGING THE SEALING EFFECTIVENESS OF A SEALED COMPARTMENT

(75) Inventor: Michael Stumpf, Seven Mile, OH (US)

(73) Assignee: QST Holdings, L.L.C., Brentwood, TN (US)

( * ) Notice: Subject to any disclaimer, the term of this patent is extended or adjusted under 35 U.S.C. 154(b) by 253 days.

(21) Appl. No.: 10/138,673

(22) Filed: May 2, 2002

(65) Prior Publication Data

US 2004/0123648 A1 Jul. 1, 2004

(51) Int. Cl.
*G01N 29/02* (2006.01)

(52) U.S. Cl. ..................... 73/40.5 A; 73/592
(58) Field of Classification Search ............. 73/40.5 A, 73/40.5 R, 40, 49.3, 49.2, 45.4, 52, 592, 73/571; 702/50, 51, 47
See application file for complete search history.

(56) References Cited

U.S. PATENT DOCUMENTS

| | | | |
|---|---|---|---|
| 3,978,915 A | | 9/1976 | Harris |
| 4,416,145 A | * | 11/1983 | Goodman et al. ........ 73/40.5 A |
| 4,719,801 A | * | 1/1988 | Blaser et al. ................. 73/592 |
| 4,901,576 A | * | 2/1990 | Rademacher ................ 73/592 |
| 4,987,769 A | | 1/1991 | Peacock et al. |
| 5,118,463 A | | 6/1992 | Bordy et al. |
| 5,231,866 A | * | 8/1993 | Peacock ................... 73/40.5 A |
| 5,780,723 A | | 7/1998 | Koo |
| 5,955,670 A | | 9/1999 | Goodman et al. |
| 6,216,539 B1 | * | 4/2001 | Johnson et al. ............... 73/592 |
| 6,430,988 B1 | * | 8/2002 | Watanabe ................ 73/40.5 A |

FOREIGN PATENT DOCUMENTS

| | | |
|---|---|---|
| DE | 4237527 A | 5/1994 |
| FR | 2310558 | 12/1976 |
| JP | 2000-304660 A | 11/2000 |

* cited by examiner

*Primary Examiner*—Helen Kwok
(74) *Attorney, Agent, or Firm*—Thomas, Kayden, Horstemeyer & Risley, L.L.P.

(57) ABSTRACT

An improved and non-destructive test method and system utilizes ultrasound wave energy to automatically judge the sealing effectiveness of a sealed compartment such as the cabin of a motor vehicle or aircraft. An ultrasonic transmitter generates ultrasound energy of a specified frequency within the compartment, and one or more ultrasound sensors outside the volume detect the presence and amplitude of ultrasound energy at the specified frequency. Alternatively, the transmitter can be configured to generate ultrasound energy outside the compartment, and the sensors can be arranged to detect ultrasound energy within the compartment. The detected energy level is compared to a calibrated threshold, and a leak indication is generated if the threshold is exceeded. In a factory setting, the volume can be passed through an arched array of ultrasound sensors strategically located to detect the presence and amplitude of ultrasound energy of the specified frequency in the vicinity of potential leakage areas of the compartment. If the position of the compartment relative to the sensor array is known, the leak indication can be used to pinpoint the location of the leak, and to suggest specific corrective action.

12 Claims, 3 Drawing Sheets

US 6,983,642 B2

SYSTEM AND METHOD FOR AUTOMATICALLY JUDGING THE SEALING EFFECTIVENESS OF A SEALED COMPARTMENT

TECHNICAL FIELD

This invention relates to a system and method of automatically judging the sealing effectiveness of a sealed compartment such as the passenger cabin of a vehicle or aircraft, and more particularly to a testing method based on ultrasonic leakage.

BACKGROUND OF THE INVENTION

In the manufacture or repair of products that include a sealed compartment, various methods have been used to determine how well the compartment is sealed, and where water or air intrusion (or extrusion) might occur. In the case of vehicles, for example, it is important to verify that water will not leak into the passenger compartment. Since visual inspection can be highly unreliable, certain vehicle manufacturers utilize spray booths for subjecting fully assembled vehicles to an intense water spray to ensure that vehicles shipped from the factory will not leak due to faulty or damaged seals. While this type of testing can be fairly reliable, it requires a worker to check for the presence of water in the cabin, and it is destructive in the sense that it can cause significant water intrusion in poorly sealed vehicles, or in vehicles where a window or door has been inadvertently left partially open, requiring significant expenditure of time and material for repairs due to water damage. Additionally, the spray booths are expensive to install and maintain, and cannot be easily duplicated at vehicle service and repair facilities. Accordingly, what is needed is method of testing the sealing effectiveness of a sealed compartment that is non-destructive, automatic, and easy and cost effective to implement.

SUMMARY OF THE INVENTION

The present invention is directed to an improved and non-destructive test method and system in which ultrasound wave energy is used to automatically judge the sealing effectiveness of a sealed compartment such as the cabin of a motor vehicle or aircraft. In a preferred embodiment, an ultrasonic transmitter generates ultrasound energy of a specified frequency within the cabin, and an array of ultrasound sensors outside the cabin detects the presence and amplitude of ultrasound energy at the specified frequency. Alternatively, one or more transmitters can be configured to generate ultrasound energy outside the cabin, and the sensors can be arranged to detect ultrasound energy within the cabin. The detected energy level is compared to a calibrated threshold, and a leak indication is generated if the threshold is exceeded. In a factory setting, the vehicle can be passed through an array of ultrasound sensors strategically located to detect the presence and amplitude of ultrasound energy of the specified frequency in the vicinity of potential leakage areas of the compartment. If the position of the compartment relative to the sensor array is known, the leak indication can be used to pinpoint the location of the leak, and to suggest specific corrective action.

BRIEF DESCRIPTION OF THE DRAWINGS

FIG. 1 depicts a rear view of a vehicle passing through the arch, while FIG. 2 depicts a side view of vehicles at three different stages of testing according to this invention.

DESCRIPTION OF THE PREFERRED EMBODIMENT

The present invention is disclosed and described in the context of a motor vehicle assembly plant where fully assembled vehicles are tested to judge the sealing effectiveness of the passenger cabin. Areas where a seal, such as a window or door seal, is damaged or improperly installed, creating a potential water intrusion site, are identified so that the vehicle can be repaired before being shipped to a dealer or holding area. However, it will be recognized that the present invention is equally applicable to other products, such as the cabin of an aircraft, or any other sealed compartment.

Figure 1:
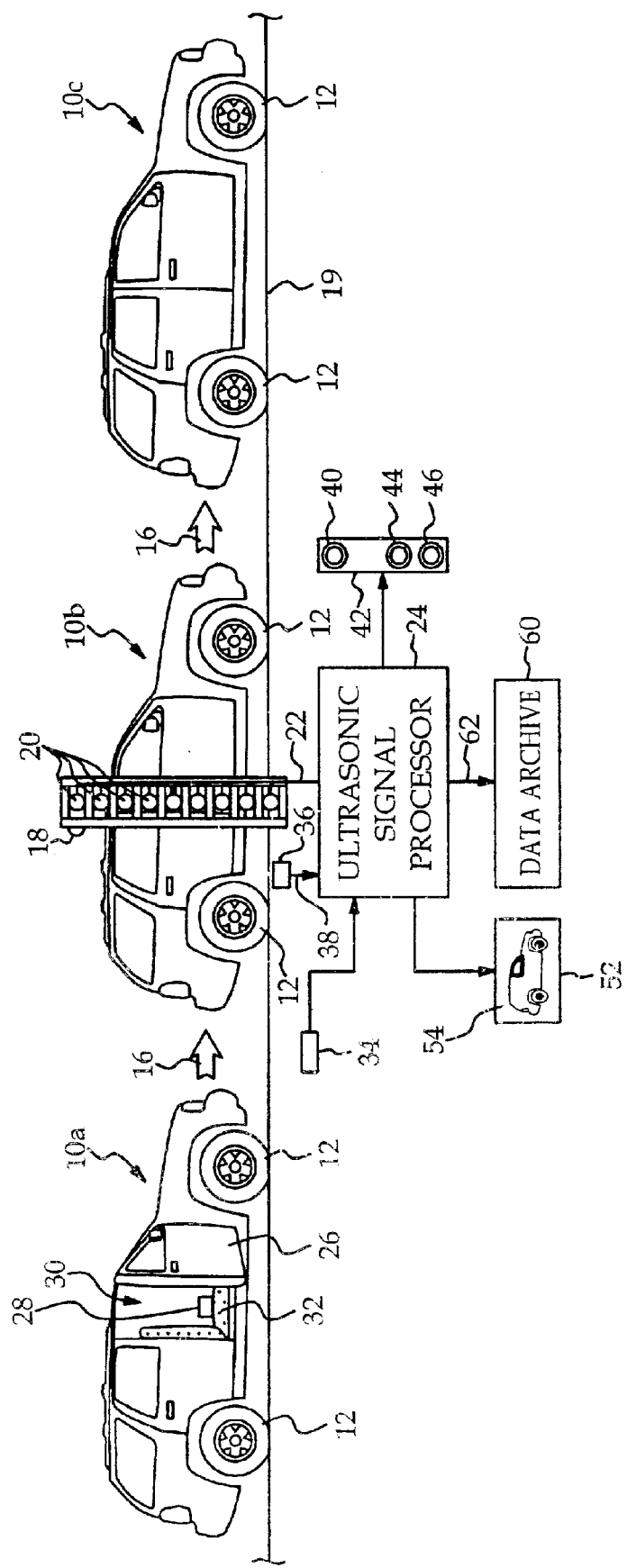
FIGS. 1 and 2 depict a vehicle assembly plant final inspection area, including an ultrasonic receiver array in the form of an arch through which fully assembled vehicles are passed for purposes of identifying potential water intrusion sites according to a preferred embodiment of this invention, and a signal processor for collecting and processing signals developed by the ultrasonic receiver array.
Figure 2:
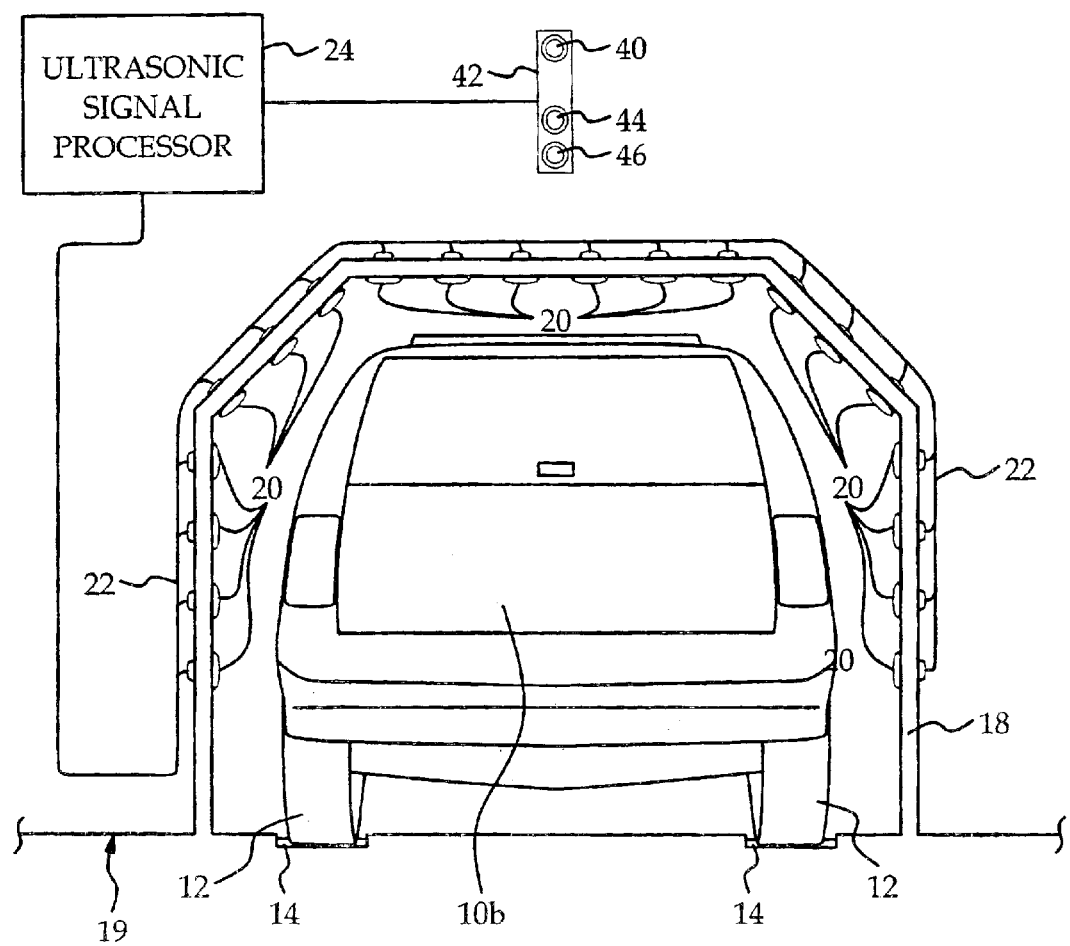

Referring to the drawings, FIGS. 1 and 2 depict a test and inspection area of a vehicle assembly plant according to a preferred embodiment of this invention. FIG. 1 depicts a series of three vehicles 10a, 10b, 10c in elevation at various stages of testing, and FIG. 2 depicts a rear-view of the vehicle 10b. The tires 12 of vehicles 10a–10c are disposed on movable tracks 14 that linearly displaces the vehicles 10a–10c from left to right as indicated by the arrows 16, and an arch 18 is supported on the factory floor 19 about the tracks 14 so that the vehicles 10a–10c sequentially pass through the arch 18. The arch 18 supports an array of ultrasonic sensors or receivers 20 (as manufactured and sold by UE Corporation, for example) positioned to detect ultrasonic energy emitted from an area within the arch 18, and a communications cable 22 couples each receiver 20 to a signal processor 24, which may be a conventional computer work station. In the illustrated embodiment, the arch 18 is simply a fixed tubular frame fixtured to support the receivers 20 and associated cables 22. However, the arch 18 may be designed to be configurable (i.e., collapsible or expandable) in height, width and even length in order to maintain reasonably close spacing of the receivers 20 relative to any given type of vehicle passing under the arch 18.

As each vehicle approaches arch 18, its door 26 is opened as indicated at vehicle 10a, and an ultrasonic transmitter 28 (as manufactured and sold by UE Corporation, for example) is placed in the passenger cabin 30, such as on a seat or console 32. The transmitter 28 is activated to emit ultrasonic energy at a specified frequency of approximately 40 kHz, and the door 26 is closed. Additionally, a fixed or hand-held bar code scanner 34 coupled signal processor 24 is used to scan the vehicle identification number (VIN) of each vehicle 10a approaching the arch 18, and a motion detector 36 (which may be mounted on arch 18, if desired) coupled to signal processor 24 provides an indication on line 38 when a vehicle 10a is about to enter the arch 18.

When the motion detector 36 indicates that a vehicle 10a is about to enter arch 18, the signal processor 24 begins collecting data generated by the ultrasonic receivers 20, and generates and stores an ultrasonic signal profile for each receiver 20. Optionally, it may be desired to include an sensor for detecting the position of the vehicle 10b with respect to the arch 18 (for example, by detecting the displacement of track 14 once the motion detector 36 indicates that a vehicle 10b is entering arch 18) so that the profile data may be more accurately associated with the corresponding region of the vehicle. As the profiles are being generated, the individual signal values are compared with a threshold (which may be single value or a multi-value profile) to determine if the ultrasonic energy emitted from the vehicle 10b passing through the arch 18 exceeds the threshold. So long as the receiver signal values are within the respective thresholds, the signal processor 24 illuminates a green lamp 40 on a visual pass/fail indicator 42 (which may be affixed to the arch 18), and the transmitter 28 is removed from the vehicle 10c after it has completely passed through the arch 18. However, if any of the collected data exceeds a respective threshold, the signal processor 24 activates a red lamp 44 of indicator 42, as well as an audible alarm or horn 46. This alerts final inspection personnel that a vehicle 10b has failed the gross leakage test, and the vehicle 10b is then inspected, visually and/or with one or more hand-held ultrasonic receivers, to identify the location of the ultrasonic leakage. If a repair of the vehicle 10c is required, it is moved to a repair bay for repair or replacement of defective parts, and then re-introduced to the inspection area upstream of the arch 18 for retesting.

In addition to simply indicating that a vehicle has failed the leak test, the signal processor 24 can be easily programmed to pinpoint the location of the leakage and to suggest specific corrective action. For example, if the data that exceeded the threshold (leading to a fail indication) was obtained from receivers 20 disposed in proximity to a particular window seal of the vehicle 10b, a visual display 52 coupled to the signal processor 24 can be utilized to direct the final inspection personnel to inspect that area of the vehicle for seal damage, or to make sure that the respective window and door are fully closed. For instance, the display 52 may depict an outline image of the vehicle 10b, with the leakage area highlighted and/for are pointed out as generally designated in FIG. 1 by the reference numeral 54.

The signal processor 24 additionally transfers the stored signal profiles from individual vehicles 10a–10c, along with the respective vehicle identification numbers, to a data archival system 60 via communication cable 62. The archived data for a given set of vehicles can then be analyzed for quality control purposes. For example, if the archived profiles reveal that a statistically significant number of vehicles exhibited higher than expected ultrasonic leakage, despite passing the leak test, the vehicle design parameters and components pertaining to the identified leakage area can be analyzed and possibly changed to prevent the manufacture of vehicles that would eventually fail the leakage test.

Figure 3:
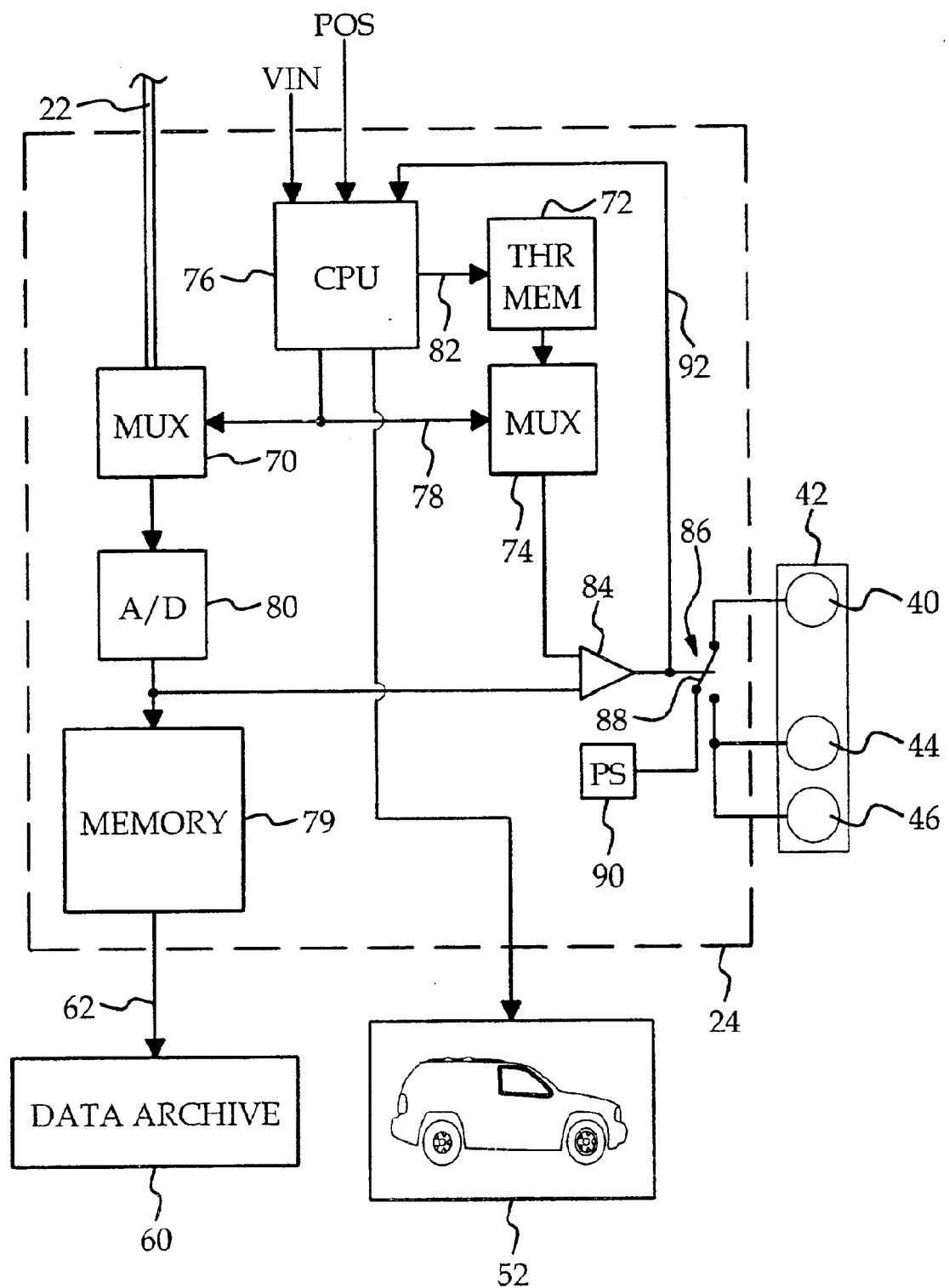
FIG. 3 is process flow diagram illustrating processing steps carried out by the signal processor of FIG. 1.

The block diagram of FIG. 3 generally illustrates the above-described functionality of signal processor 24 and its associated output devices. Referring to FIG. 3, the signal processor 24 includes a multiplexer (MUX) 70 coupled to receiver communication cable 22, a threshold memory (THR MEM) 72 for storing a set of threshold profiles for the vehicles under test, a multiplexer (MUX) 74 coupled to the threshold memory 72, and a central processing unit (CPU) 76 for controlling the operation of multiplexers 70 and 74 and threshold memory 72 in response to the vehicle identification (VIN) and vehicle position (POS) inputs. As indicated above, the VIN input may be obtained from bar code scanner 34, and the POS input may be obtained either from a dedicated sensor or deduced from the motion sensor 36. Also, the threshold profiles stored in threshold memory 72 may be individually calibrated values, or may be generated based on receiver data obtained from a vehicle cabin that is known to be properly sealed.

As the vehicle 10b under test moves through the arch, the CPU 76 signals the multiplexer 70 via line 78 to sequentially sample the various receivers 20, which samples are converted to a digital format by the A/D converter 80, and stored along with the corresponding VIN in memory device 79. At the same time, the CPU 76 signals threshold memory 72 and multiplexer 74 via lines 82 and 78, respectively, to select threshold values corresponding to the sampled receiver signals. The sampled value from A/D converter 80 and the corresponding threshold value from multiplexer 74 are compared by comparator 84, which controls the operation of a switching device 86. The switch arm 88 of switching device 86 is coupled to a power supply (PS) 90, and selectively couples power supply 90 to either the green lamp 40, or the red lamp 44 and horn 46, as shown. So long as the sampled receiver value from A/D converter 80 is less than the threshold value from the multiplexer 74, the comparator 84 maintains the switch arm 88 in the illustrated state, in which the power supply 90 activates the green lamp 40. However, when the sampled receiver value from A/D converter 80 exceeds the threshold value from the multiplexer 74, the comparator 84 moves the switch arm 88 to the opposite state in which the power supply 90 activates the red lamp 44 and horn 46. At such time, the CPU 76 is also notified of the failed status of the vehicle under test via line 92, and activates the display 52 to highlight the suspected source of ultrasonic leakage, based on the position signal POS and the receiver location that produced the higher than expected ultrasonic leakage.

In the manner described above, the system and method of the present invention utilizes ultrasound wave energy to simply and reliably judge the sealing effectiveness of a sealed compartment such as a motor vehicle or aircraft cabin without causing vehicle damage in cases where there is a bad or improperly installed seal. The testing is easy and cost effective to implement in a factory setting, and can be easily reproduced at vehicle service and repair facilities with simple hand-held ultrasonic transmitters and receivers. While described in reference to the illustrated embodiment, it is expected that various modifications in addition to those mentioned above will occur to those skilled in the art. For example, the arch 18 may be designed to move one or more receivers 20 (longitudinally and/or laterally) with respect to the sealed compartment, instead of moving the sealed compartment past stationary receivers 20, as shown. Additionally, it may also be possible in the case of vehicles to utilize the vehicle entertainment system to generate ultrasonic energy in the passenger compartment 30 simply by playing a suitably programmed CD or audio cassette. Also, it may be practical in certain installations to place one or more receivers 20 under the vehicles 10a–10c, as in a bay located below the arch 18 and between the tracks 14. Furthermore, the arch 18 may be significantly longer than shown, with a distribution of receivers 20 for taking an ultrasonic snapshot of a vehicle that is stationary with respect to the arch. Thus, it will be understood that systems and methods incorporating these and other modifications may fall within the scope of this invention, which is defined by the appended claims.

What is claimed is:

1. Apparatus for automatically indicating sealing effectiveness of a sealed compartment, comprising:

an ultrasonic transmitter for generating energy of a specified frequency within the sealed compartment;

an array of ultrasonic receivers mounted on an arch disposed outside the sealed compartment for sensing ultrasonic energy of the specified frequency and producing output signals in accordance therewith;

means for producing a relative movement of the sealed compartment and the arch such that the sealed compartment passes through the arch; and signal processing means for automatically sampling the output signals of said ultrasonic receivers during the relative movement of the sealed compartment and the arch, and for indicating the sealing effectiveness of the sealed compartment by comparing the sampled output signals to thresholds establishing levels of ultrasonic energy that will be sensed when the sealed compartment is effectively sealed.

2. The apparatus of claim 1, including detection means for detecting a relative position of the sealed compartment and the arch, and wherein the signal processing means coordinates the sampling of the ultrasonic receiver output signals with the detected relative position.

3. The apparatus of claim 1, wherein the signal processing means includes means for storing the sampled ultrasonic receiver output signals, and for transferring the stored output signals to a data archive.

4. The apparatus of claim 1, wherein the signal processing means judges that the sealed compartment is effectively sealed when a sampled output signal is below a respective threshold, and that the sealed compartment is not effectively sealed when a sampled output signal is above a respective threshold.

5. The apparatus of claim 4, further comprising:

a visual indicator activated when the signal processing means judges that the sealed compartment is not effectively sealed.

6. The apparatus of claim 4, wherein the signal processing means identifies a zone of the sealed compartment corresponding to a sampled output signal that is above a respective threshold, and the apparatus further comprises:

a visual indicator activated by the signal processing means to produce an image of the sealed compartment, with said identified zone highlighted to indicate a zone of ineffective sealing.

7. The apparatus of claim 1, where the arch is stationary, and the means for producing a relative movement of the sealed compartment and the arch moves the sealed compartment through the stationary arch.

8. A method for automatically indicating sealing effectiveness of a sealed compartment, comprising the steps of:

generating energy of a specified frequency within the sealed compartment;

sensing ultrasonic energy of the specified frequency via an array of ultrasonic receivers mounted on an arch disposed outside the sealed compartment;

producing, via the array of ultrasonic receivers, output signals in accordance with the sensing step;

producing relative relative movement of the sealed compartment and the arch such that the sealed compartment passes through the arch;

sampling the output signals of the ultrasonic receivers during the relative movement of the sealed compartment and the arch;

comparing the sampled output signals to thresholds establishing levels of ultrasonic energy that will be sensed when the sealed compartment is effectively sealed; and indicating the sealing effectiveness of the sealed compartment based on the comparing step.

9. The method of claim 8, further comprising the steps of:

detecting a relative position of the sealed compartment and the arch; and coordinating the sampling step with the detected relative position.

10. The method of claim 8, further comprising the step of activating a visual indicator if the sealed compartment is not effectively sealed.

11. The method of claim 8, further comprising the steps of:

identifying a zone of the sealed compartment corresponding to a sampled output signal that indicates the sealed compartment is not effectively sealed; and producing an image of the sealed compartment with the identified zone highlighted to indicate a zone of ineffective sealing.

12. The method of claim 8, wherein the arch is stationary, and wherein the producing relative movement step comprises the step of moving the sealed compartment through the arch.

* * * * *

UNITED STATES PATENT AND TRADEMARK OFFICE
CERTIFICATE OF CORRECTION

PATENT NO. : 6,983,642 B2
DATED : January 10, 2006
INVENTOR(S) : Stumpf

It is certified that error appears in the above-identified patent and that said Letters Patent is hereby corrected as shown below:

Column 5,
Line 42, "where" should be -- wherein --.

Column 6,
Line 11, the second occurrence of "relative" should be deleted.

Signed and Sealed this

Twenty-first Day of March, 2006

JON W. DUDAS
*Director of the United States Patent and Trademark Office*